(12) United States Patent
Pascuzzi et al.

(10) Patent No.: US 12,068,695 B2
(45) Date of Patent: Aug. 20, 2024

(54) UNIT LEVEL ISOLATED BUS TRANSFER DEVICE

(71) Applicant: Product Development Associates, Inc., Burnsville, MN (US)

(72) Inventors: Anthony James Pascuzzi, Burnsville, MN (US); Christopher Paul Henze, Lakeville, MN (US)

(73) Assignee: Product Development Associates, Inc., Burnsville, MN (US)

( * ) Notice: Subject to any disclaimer, the term of this patent is extended or adjusted under 35 U.S.C. 154(b) by 507 days.

(21) Appl. No.: 17/205,504

(22) Filed: Mar. 18, 2021

(65) Prior Publication Data

US 2022/0302845 A1 Sep. 22, 2022

(51) Int. Cl.
*H02M 3/335* (2006.01)
*H02M 3/158* (2006.01)

(52) U.S. Cl.
CPC ....... *H02M 3/33576* (2013.01); *H02M 3/158* (2013.01)

(58) Field of Classification Search
CPC ............. H02M 3/33576; H02M 3/158; H02M 3/33592; H02M 3/3372; H02M 3/3376; H02M 3/33573
See application file for complete search history.

(56) References Cited

U.S. PATENT DOCUMENTS 5,856,712 A 1/1999 Suzuki et al.
5,982,645 A * 11/1999 Levran .................. H01F 27/306
363/71
6,198,178 B1 * 3/2001 Schienbein ............. H02M 7/49
307/82
9,906,067 B1 * 2/2018 Garrity ..................... H02J 7/04
2002/0140403 A1 * 10/2002 Reddy ..................... H02J 9/062
320/162

(Continued)

FOREIGN PATENT DOCUMENTS

EP 1254505 B1 10/2012
EP 2701276 B1 11/2016

OTHER PUBLICATIONS

International Search Report and Written Opinion of PCT Application No. PCT/2022/020814 dated Jun. 28, 2022, 15 pages.

(Continued)

*Primary Examiner* — Nguyen Tran
(74) *Attorney, Agent, or Firm* — Mueting Raasch Group

(57) ABSTRACT

An apparatus for high-speed switching between a plurality of power sources includes a switch-mode isolation transformer. The switch-mode isolation transformer includes a plurality of isolated primary windings. Each of the plurality of isolated primary windings can be electrically isolated from others of the isolated primary windings and selectively couplable to a power source of the plurality of power sources. The switch-mode isolation transformer further includes a secondary winding coupled to a load. The apparatus further includes a controller to selectively couple one of the plurality of power sources through a corresponding isolated primary winding, responsive to detecting an adverse condition in another power source of the plurality of power sources. Other methods and systems are also described.

21 Claims, 8 Drawing Sheets

(56) References Cited

U.S. PATENT DOCUMENTS

2011/0273136 A1* 11/2011 Yoshimoto .............. B60L 53/14
320/103
2014/0054968 A1* 2/2014 Szu ........................ H02M 1/10
307/72

OTHER PUBLICATIONS

Zhao et al., "A Novel three-phase three-port UPS employing a single high-frequency isolation transformer", Power Electronics Specialists Conference, 2004, IEEE 35th Annual, 6:4135-4141.

* cited by examiner

UNIT LEVEL ISOLATED BUS TRANSFER DEVICE

The present disclosure pertains to uninterruptable power supplies.

An Uninterruptable Power Supply (UPS) is an electrical apparatus that provides power to critical equipment that must operate continuously without even a momentary interruption. A typical UPS converts unregulated alternating current (AC) voltage from an electrical utility into direct current (DC) voltage using an AC-DC converter, and then back to a regulated AC voltage using a DC-AC converter to provide power to critical equipment. A DC link of a typical UPS often includes an additional connection to a storage battery or capacity bank and maintains the storage battery or capacity bank in a state of constant charge, where the DC link comprises circuitry such as capacitance and rectifier circuitry. If the electrical utility voltage drops below a useable threshold, the UPS maintains a constant regulated AC voltage output by keeping the DC-AC converter operating using the power stored in the storage battery or capacity bank without disturbance until the electrical utility becomes available or the storage battery or capacity bank is depleted. However, batteries used in such UPS systems are often very large and heavy and can pose safety hazards and environmental hazards.

Other UPS systems may include multiple generators to create redundant electrical power busses. To ensure redundancy, the busses are not interconnected so that failure of one bus will not affect others of the multiple busses. Automatic systems such as bus transfer switches are provided to disconnect critical equipment from a failed bus and connect such critical equipment to a redundant power bus. However, this disconnect and reconnect process can take hundreds of milliseconds, which can be acceptable for some systems while other systems may not operate correctly with input voltage disruptions of more than tens of milliseconds.

SUMMARY

Switch-mode transformers can be used to switch between different power sources if a power source falls outside of an operational range and can be used in place of the solid-state switches. Further, switch-mode transformers can be used in place of other types of isolation transformers to save space and cost, because isolation transformer that operates at typical utility frequencies are prohibitively large and expensive. A switch-mode transformer with a switching frequency much higher than the utility frequency (e.g., the frequency of the alternating voltage of the electrical utility) can provide the same function as a utility frequency isolation transformer, but will be smaller, lighter and less costly.

An exemplary apparatus for high-speed switching between power sources can include a switch-mode isolation transformer. This transformer can include a plurality of isolated primary windings. Each of the plurality of isolated primary windings can be electrically isolated from each other and selectively couplable to a power source of the plurality of power sources. The transformer can further include a secondary winding coupled to a load. At least one of the plurality of power sources can comprise a direct current (DC) power source. The switch-mode isolation transformer can transform one phase of a three-phase power source.

The apparatus can further include a controller operatively coupled to the switch-mode isolation transformer and configured to selectively couple one of the power sources of the plurality of power sources through a corresponding isolated primary winding, responsive to detecting an adverse condition in another power source of the plurality of power sources. Detection of an adverse condition can comprise detection of output power from another power source above a power threshold. The controller can be optically isolated from the switch-mode isolation transformer.

In one or more embodiments, the switch-mode isolation transformer can operate at a frequency at least five orders of magnitude higher than a frequency of the power source. For example, the switch-mode isolation transformer can operate at a frequency of between 25 kHz and 2.5 MHz.

In one or more embodiments, the switch-mode isolation transformer further comprises a plurality of switch circuits. Each switch circuit can be coupled to a power source and an isolated primary winding to selectively coupled the power source to the isolated primary winding. At least one input switching element can block current in either polarity when the input switching element is "off." The input switching element can conduct current in either polarity when the input switching element is "on." The input switching element can include H-bridge circuitry comprised of four switches. Each of the four switches can comprise two field effect transistors (FETs) connected with a common source. The two FETs can include two N-channel metal oxide silicon FETs (MOSFETs). Gates of the two FETs can be driven through a common gate drive circuit. Each of the four switches can comprise one field effect transistor (FET) coupled to four diodes. The controller can control the H-bridge circuitry to provide inverted power output from one power source relative to another power source of the plurality of power sources. The controller can control input switching elements to provide square wave output from the DC power source.

An exemplary method for controlling high-speed switching between a plurality of power sources can comprise controlling switching elements to couple a first primary winding of a transformer to a primary power source of the plurality of power sources. The method can further comprise detecting an adverse condition of the primary power source of the plurality of power sources. The method can further comprise, responsive to detecting the adverse condition, controlling switching elements to couple a second primary winding of the transformer to a secondary power source. Controlling switching elements can comprise providing power to gate drives of respective switching elements. Responsive to detecting the adverse condition, power can be removed from a gate drive of a switching element coupled to the first primary winding concurrently with, or within a predetermined time delay of, providing power to a gate drive of a switching element coupled to the second primary winding. The time delay can be set based on frequency of at least one of the primary power source and the secondary source.

BRIEF DESCRIPTION OF THE DRAWINGS

Throughout the specification, reference is made to the appended drawings, where like reference numerals designate like elements. A brief description of the drawings is provided below.

DETAILED DESCRIPTION

Figure 1:
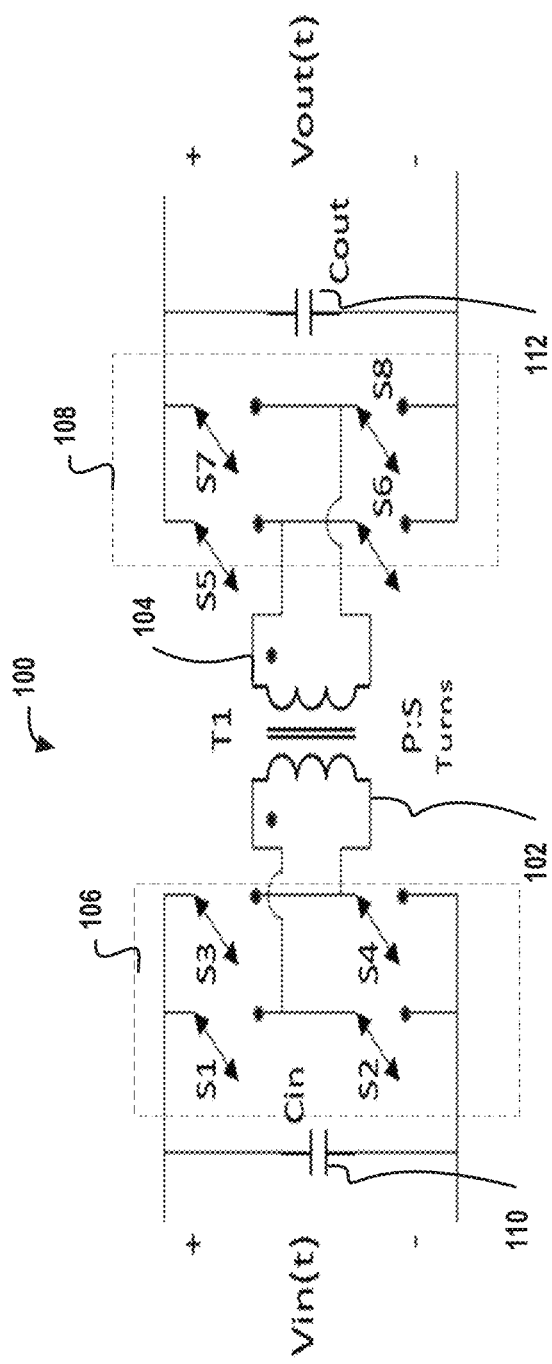
FIG. 1 is a schematic diagram of a high-frequency switch-mode transformer according to an example embodiment.

Exemplary methods, apparatus, and systems shall be described with reference to FIGS. 1-7. It will be apparent to one skilled in the art that elements or processes from one embodiment can be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein can include many elements that are not necessarily shown to scale. Still further, it will be recognized that timing of the processes and the size and shape of various elements herein can be modified but still fall within the scope of the present disclosure, although certain timings, one or more shapes and/or sizes, or types of elements, can be advantageous over others.

In some applications involving critical systems, equipment operates continuously and is unable to tolerate even a momentary interruption. In at least these applications, operators include an uninterruptable power supply (UPS) in the system interface to the electrical utility provider. A typical UPS converts the incoming unregulated alternating current (AC) voltage provided by or from the electrical utility into a direct current (DC) voltage. The UPS can then convert DC voltage to a clean, regulated AC voltage that provides power to the critical equipment. The DC link of the UPS can also include a bidirectional connection to a back-up storage device, such as a storage battery (maintained in a state of constant charge) or a capacitor bank. If the utility voltage drops below a threshold, the storage battery or capacitor bank connected to the DC link can maintain the DC-AC converter in an operational state for a time period until the back-up storage device is available. This time period can be several milliseconds, for example 5-10 milliseconds, or no more than tens of milliseconds. The back-up storage device can be sized to operate the critical equipment for any defined length of time. For example, the back-up storage device can operate critical equipment until back-up generators can be brought online, or for hours or days, or only until the system can be safely shut down.

UPS systems can be expensive to buy, install, and maintain. Furthermore, UPS systems often are large and heavy, especially when a large storage battery is required. This limits the applicability when there are space and weight limitations. UPS systems can also be inefficient, resulting in power loss as power is converted multiple times from AC-to-DC and DC-to-AC.

This power loss adds to the cost of operating critical equipment and can require additional cooling for the facility or installation. Further, the batteries used in UPS systems often wear out and have maintenance and testing requirements, which adds to the cost of operation and the need to employ specialized personnel to perform maintenance and testing. Furthermore, batteries can pose a safety hazard and an environmental hazard, due to the use of harsh chemical and toxic gases within batteries.

Most computer and supporting equipment that operate with AC utility voltage internally convert the incoming AC voltage to regulated DC voltages for internal use. A typical AC-to-DC power conversion circuit includes capacitors to store energy when the AC voltage traverses through zero, which happens twice per utility cycle due to the sine-wave nature of an AC voltage waveform. Furthermore, these capacitors are sized to provide short term energy storage for sags, surges, swells, spikes and sub-cycle outages that can occur in utility systems and commonly last for at least one utility cycle, or about 20 milliseconds (ms) for a 50-Hz AC signal.

Some systems, for example power distribution systems for airplanes, ships, and submarine, can use two or more independent generators, provided in a redundant fashion, to provide two or more independent electric power buses for onboard use. To ensure redundancy, these buses are isolated (e.g., not interconnected) to prevent failure on one bus from causing failure on other buses. Such systems can also provide circuit breakers and contactors within the power distribution system so that distribution circuits powering critical loads can be connected to either of the two or more independent power buses. Systems such as bus transfer switches can disconnect from a failed bus and reconnect to another, redundant power bus. However, this disconnect and reconnect process can take hundreds of milliseconds, and therefore, may not be fast enough for systems relying on no more than tens of milliseconds of unavailable power. Therefore, these systems often still rely on UPS systems to provide power during switchover, adding to cost, safety problems, and other issues described above that can occur with UPS systems.

Solid-state bus transfer switches can switch between redundant buses much faster than hundreds of milliseconds, and in some cases, can perform crossover in under 20 milliseconds. Such switches can be used without a UPS. However, failure of such solid-state bus transfer switches can short the redundant buses together, causing a failed redundant bus to generate failures in other redundant buses. Furthermore, some three-phase delta power systems use a high-speed solid-state bus transfer switch comprised of silicon-controlled rectifiers (SCRs) that momentarily connect redundant power busses together to facilitate SCR commutation during the cross over. During the transfer, the SCRs and the generator might be subjected to transients as energy passes upstream into the failed bus because isolation is not maintained. Finally, some bus transfer switches are used at the level of distribution branch circuits because only a small portion of a total system load can require fast switchover (e.g., tens of milliseconds or about 20 milliseconds). In at least these cases, it may not be desirable to provide solid-state bus transfer switches for all distribution branches, due to the size and cost of providing such switches for the entire system load.

Switch-mode transformers can be used in place of the above-described solid-state switches. A typical utility frequency is about 50-60 Hz for ground systems, and about 400 Hz for aircraft systems. An isolation transformer that operates at such frequencies would be prohibitively large, leading to increased costs. A switch-mode isolation transformer with a switching frequency much higher than the utility frequency can provide the same function as a utility frequency isolation transformer, but will be smaller, lighter and less costly. Accordingly, example embodiments provide a high-frequency switch-mode transformer.

FIG. 1 is a schematic diagram of an illustrative high-frequency switch mode transformer 100 according to an example embodiment. The size and weight of the high-frequency switch mode transformer 100 is greatly reduced from that of a similar transformer operating at utility frequencies because of the high-frequency operation. The illustrative high-frequency switch mode transformer 100 also allows for a more efficient power conversion as the power conversion is AC-AC rather than from AC-to-DC and DC-to-AC as in some available power conversion and backup systems. Thus, the high-frequency switch mode transformer 100 includes multiple improvements over previous devices (e.g., typical low-frequency transformers) while still providing the same or better functionality.

Referring to FIG. 1, the output voltage as a function of time $V_{out}(t)$ is equal to the input voltage $V_{in}(t)$, scaled by a turns ratio. The switching frequency of the high-frequency switch mode transformer 100 should be much higher than the frequency of the input voltage. In some embodiments, the switching frequency of the high-frequency switch mode transformer 100 is several orders of magnitude (e.g., about three orders of magnitude) higher than the frequency of the input voltage. For example, given an input voltage $V_{in}(t)$ frequency of about 400 Hz, the switching frequency of the high-frequency switch mode transformer 100 may be about 250 KHz. Unlike a conventional transformer, the minimum input frequency is not limited. Further, unlike a conventional transformer, the high-frequency switch mode transformer 100 can pass DC voltages.

The high-frequency switch mode transformer 100 can include a primary winding 102 and a secondary winding 104, each connected to an inverter 106, 108, respectively, wherein the primary winding 102 draws power from power source/s $V_{in}(t)$ and the secondary winding 104 provides transformed power to the load $V_{out}(t)$. The inverters 106, 108 can comprise or be "H-bridge" inverters, although embodiments are not limited thereto. The inverters 106, 108 can include switching elements S1, S2, S3, S4, S5, S6, S7, S8, that may complete ("on") or break ("off") an input from an output as will be further described later herein. The inverters 106, 108 can be driven synchronously at a fifty-percent duty cycle. Generally, the high-frequency switch mode transformer 100 may provide or be configured so that the instantaneous voltage $V_{in}(t)$ applied across the input inverter 106 appears as $V_{out}(t)$ across the output inverter 108, scaled by the turn-ratio of the transformer. In some examples, a small voltage loss, on the order of one percent of the utility voltage ($V_{in}(t)$), can be seen due to voltage drops generated by the switching elements S1, S2, S3, S4, S5, S6, S7, S8. Furthermore, there can be a small, but finite switching interval that reduces the actual duty ratio from 50.0 percent, for example, a non-ideal switch-mode transformer might operate at a duty ratio of 49.7 percent. These two factors, and other factors, can generate a reduction in output voltage $V_{out}(t)$. For example, given the example reduction in duty ratio, $V_{out}(t)$ can be reduced by a factor of about 0.994 for the example duty cycles given. In some embodiments, this reduction in $V_{out}(t)$ can be compensated for by adjusting the turn ratio of the high-frequency switch mode transformer 100. In some embodiments, capacitive elements 110, 112 may be coupled between the positive and negative terminals of each of the input $V_{in}(t)$ and the output $V_{out}(t)$ to filter switching effects of the inverters 106, 108. For example, ripples at the output $V_{out}(t)$ can be reduced by increasing the size of the capacitive elements 110, 112 or by including other elements such as inductive elements and additional capacitive elements. By providing such filtering elements 110, 112, the waveform at $V_{out}(t)$ made available to electronic equipment can be identical or nearly identical to the waveform $V_{in}(t)$ as the waveform of $V_{in}(t)$ varies at the utility frequency, where the utility example can be, for example, 50 Hz, 60 Hz, 400 Hz, etc.

In one or more embodiments, the switching elements S1, S2, S3, S4, S5, S6, S7, S8 can include or may be transistors. Such transistors may be described as implementing or providing bidirectional switching in example embodiments, such that the switching elements S1, S2, S3, S4, S5, S6, S7, S8 can carry current when "on" and block voltage when "off" in both polarities (e.g., through the entire duty cycle of the waveforms of $V_{in}(t)$ and $V_{out}(t)$. The switching elements S1, S2, S3, S4, S5, S6, S7, S8 can be implemented using a variety of devices, some of which will be described below, to create bidirectional switching elements. For example, switching elements S1, S2, S3, S4, S5, S6, S7, S8 can be implemented using field effect transistors (FETs). In some examples, switching elements S1, S2, S3, S4, S5, S6, S7, S8 can be implemented using metal oxide silicon FETs (MOSFETs). In some examples, the switching elements S1, S2, S3, S4, S5, S6, S7, S8 can be implemented using N-channel MOSFETs.

In some examples, optional voltage inversion can be implemented by driving diagonal pairs of switches simultaneously to minimize disruption in waveform at the output $V_{out}(t)$. In the example embodiment illustrated in FIG. 1, switches S1, S4, S5 and S8 can be turned "on" simultaneously, then switches S2, S3, S6 and S7 can be turned "on" simultaneously. Given an input voltage represented by a sine wave, the output will similarly be a sine wave, scaled by the turn ratio of the transformer. However, if switches S1, S4, S6 and S7 are turned "on" simultaneously, and then switches S2, S3, S5 and S8 are turned "on" simultaneously, the output sine wave will be 180 degrees out of phase from the input. In some example embodiments using such voltage inversion, AC (e.g., "pseudo-AC") output $V_{out}(t)$ can be generated using a DC input. For example, a bipolar square wave voltage can be produced at the output Vout(t) by alternating, at a 60 Hz rate, for instance, between the non-inverting switching arrangement and the inverting switching arrangement. Many devices designed to operate from sine wave input voltages can operate using such square wave input voltages (e.g., pseudo-AC) "pseudo-AC" square wave input voltages.

Circuits according to example embodiments can also be used to generate a three-level-voltage waveform at the output $V_{out}(t)$, using a DC battery source at the input. The three-voltage waveform can include a first zero-voltage segment followed subsequently by a positive voltage segment (e.g., created by the non-inverting switching arrangement). This positive voltage segment can be followed subsequently by a second zero voltage segment, and the second zero voltage segment can be followed by a negative voltage segment (created by the inverting switching arrangement). To provide a zero-voltage segment, secondary switches S5-S8 are all turned "on" simultaneously while all primary side switches S1-S4 are turned "off" simultaneously. Because all primary side switches S1-S4 are "off," the output voltage $V_{out}(t)$ is zero. The amount of time spent at zero can be adjusted to keep the RMS value of the three-voltage output regulated. The amount of time that is spent at zero volts can be adjusted to keep the RMS value of the three-level voltage at $V_{out}(t)$ regulated as the battery voltage drops.

Figure 2A:
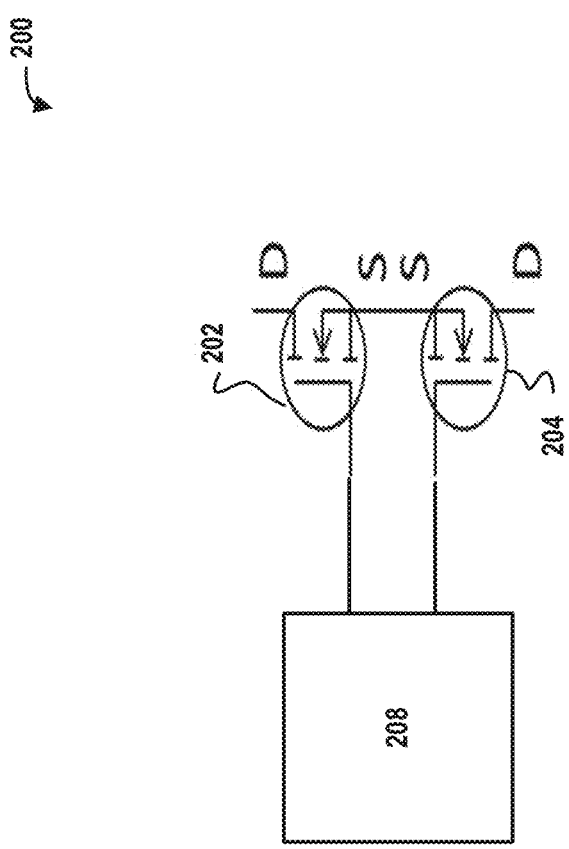
FIG. 2A is a schematic diagram of a bidirectional switch according to an example embodiment.

FIG. 2A is a schematic diagram of a bidirectional switch 200 according to example embodiments. The bidirectional switch 200 can be serve as a switch S1, S2, S3, S4, S5, S6, S7, S8 shown in FIG. 1. In at least the illustrated example, two N-channel MOSFETs 202, 204 can connect through a common source to provide a bidirectional switch 200. When the gate-to-source voltage is above the FET threshold $V_{th}$ (where the $V_{th}$ is defined as the minimum gate-to-source voltage $V_{GS\,(th)}$ that is needed to create a conducting path between the source and drain terminals) by a factor of 2 to 5 for each of the two MOSFETs 202, 204, current can be conducted in either polarity through the two drain terminals. When the gate to source voltage is below this threshold by a factor of 2 to 5, the switch will hold off a voltage in either polarity applied between the two drain terminals. Because the sources are common, the two gates can be connected (for example through a resistive element (not shown)) and driven with the same gate driver circuit 208. Because the gate drives are isolated and operate at a fifty percent duty cycle, the gate driver circuit 208 can comprise a multi-winding pulse transformer. The gate driver circuit 208 can also be coupled to the common source.

Figure 2B:
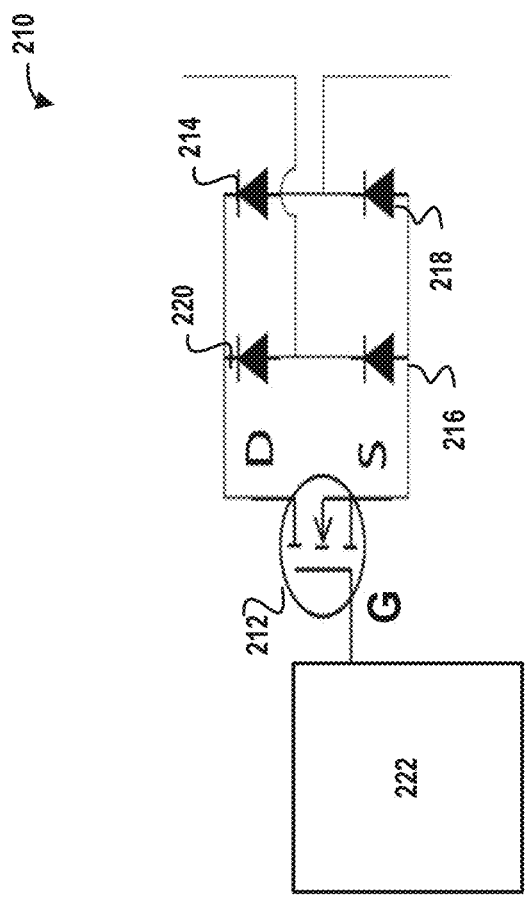
FIG. 2B is a schematic diagram of another bidirectional switching according to an example embodiment.

FIG. 2B is a schematic diagram of another bidirectional switch 210 according to an example embodiment. The bidirectional switch 210 can include a FET (e.g., N-channel MOSFET) 212 coupled to other elements of the circuit (e.g., inverter 106 or 108) through four diodes 214, 216, 218, and 220. Similarly to the switch 200 described above with respect to FIG. 2A, when the gate to source voltage is below this threshold by a certain amount, the switch 210 will hold off a voltage in either polarity applied between the two drain terminals. Similarly to the switch 200 described above with respect to FIG. 2A, a gate drive circuit 222 can drive the gate of the FET 212 and the gate drive circuit 222 can similarly comprise a multi-winding pulse transformer.

Figure 3:
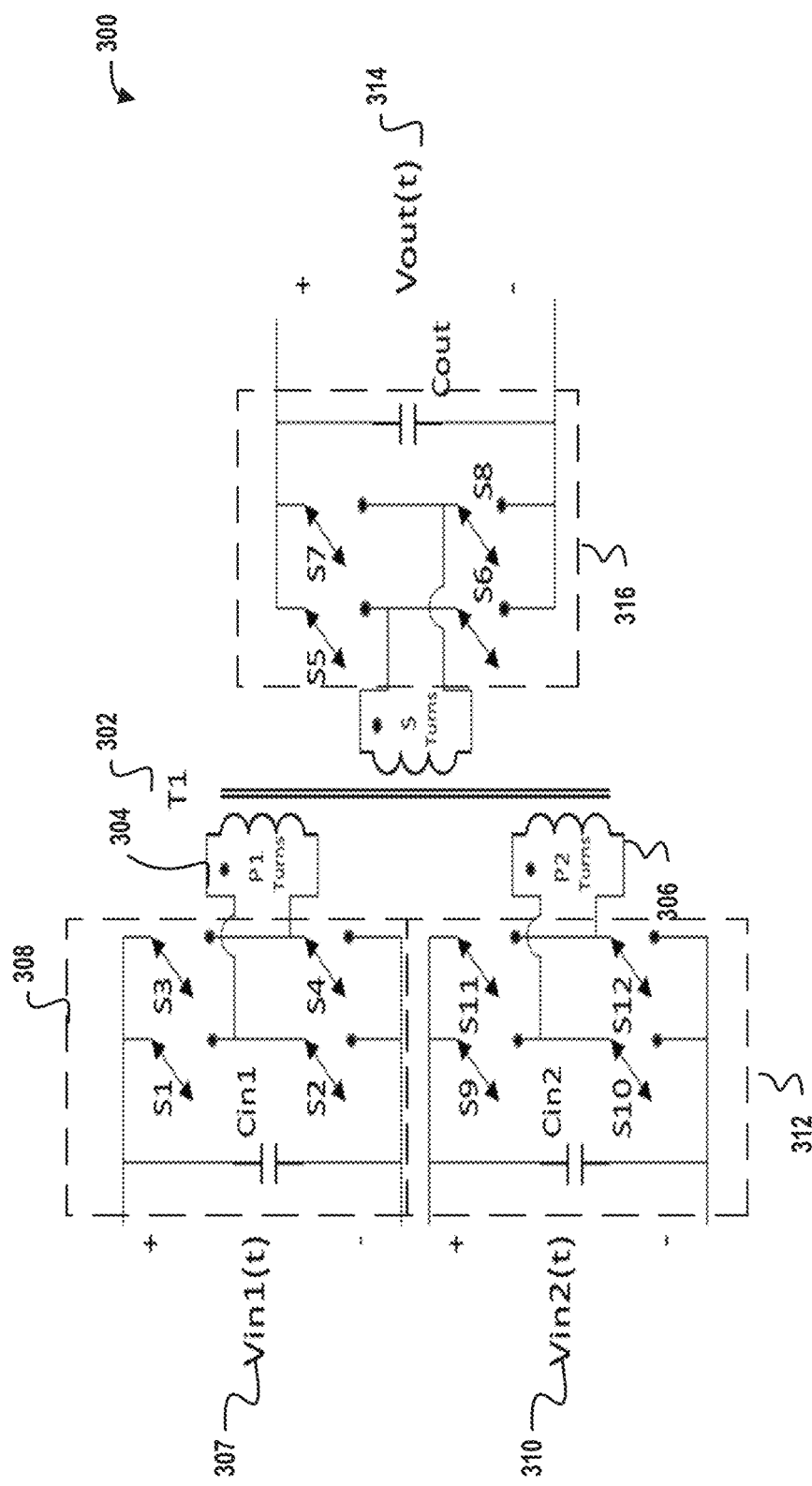
FIG. 3 is a schematic diagram of a unit level isolated bus transfer switch according to an example embodiment.

Transformers at least somewhat similar to the high-frequency switch mode transformer 100 described with respect to FIG. 1 can be connected as shown in FIG. 3 to provide an illustrative unit level isolated bus transfer switch (ULIBTS) 300 that can provide switching between power supplies. The ULIBTS 300, as shown, may include a high frequency switch-mode isolation transformer, 302. The high frequency switch-mode isolation transformer 302 is similar to the high frequency switch mode transformer 100 of FIG. 1, except that multiple isolated primary windings 304, 306 are included. The switch-mode transformer 302 provides isolation and voltage/current scaling at least somewhat similarly to available transformers. However, as transformer size varies inversely with frequency of the voltage applied to the windings of the transformer, and available utility transformers operate at relatively low utility frequencies (e.g., 50-60 Hz for ground systems or 400 Hz for aircraft systems), utility transformers are typically prohibitively large in size. In contrast, the illustrative high-frequency switch-mode isolation transformer 302 can operate at frequencies of about 25 kHz to 2.5 MHz, allowing for a much smaller and lighter transformer than would otherwise be needed at utility frequency for the same power level.

In the ULIBTS 300 of FIG. 3, a first power supply 307 is connected through a first primary circuit 308, and a second power supply 310 is connected through a second primary circuit 312. Only one of first primary circuit 308 and second primary circuit 312 may be used at a time. While two primary circuits 308, 312 and two power supplies 307, 310 are shown, the ULIBTS 300 can be used with any number of primary circuits and power supplies. Additionally, the ULIBTS 300 provides maintains isolation between the two primary circuits 308, 312. Like the high-frequency switch mode transformer 100 shown in FIG. 1, the primary circuits 308, 312 can include an H-bridge, although embodiments are not limited thereto. In one or more embodiments, the switching elements within the primary circuits 308, 312 can be configured similarly to the switching elements shown in FIGS. 2A and 2B. For example, all four switching elements in the unused primary circuit 308 or 312 are "open" when that primary circuit 308 or 312 is not in use, and all four switching elements are "closed" in a primary circuit 308, 312 when that primary circuit 308, 312 is in use. Thus, by controlling the gates of the switching elements within primary circuits 308, 312, a controller 400 (FIG. 4) can select the input power source $V_{in1}$ or $V_{in2}$ that will be provided at the output $V_{out}(t)$. The output voltage $V_{out}(t)$ is given depending on which power supply 307, 310 is in use as one of: $V_{out}(t)=(S/P1)V_{in1}(t)$ or $V_{out}(t)=(S/P2)V_{in2}(t)$ where S the number of secondary turns, P1 is the number of primary turns in primary winding 304, and P2 is the number of turns in primary winding 306.

Additionally, the ULIBTS 300 can perform voltage transformation. For example, given a primary voltage source of 240 $V_{rms}$ and a backup (secondary) voltage source of 480 $V_{rms}$, and critical electronic equipment operating with 120 $V_{rms}$, the turn-ratio of the two primary windings corresponding to each of the voltage sources can be adjusted, for example, to generate 120 $V_{rms}$ from either source.

Figure 4:
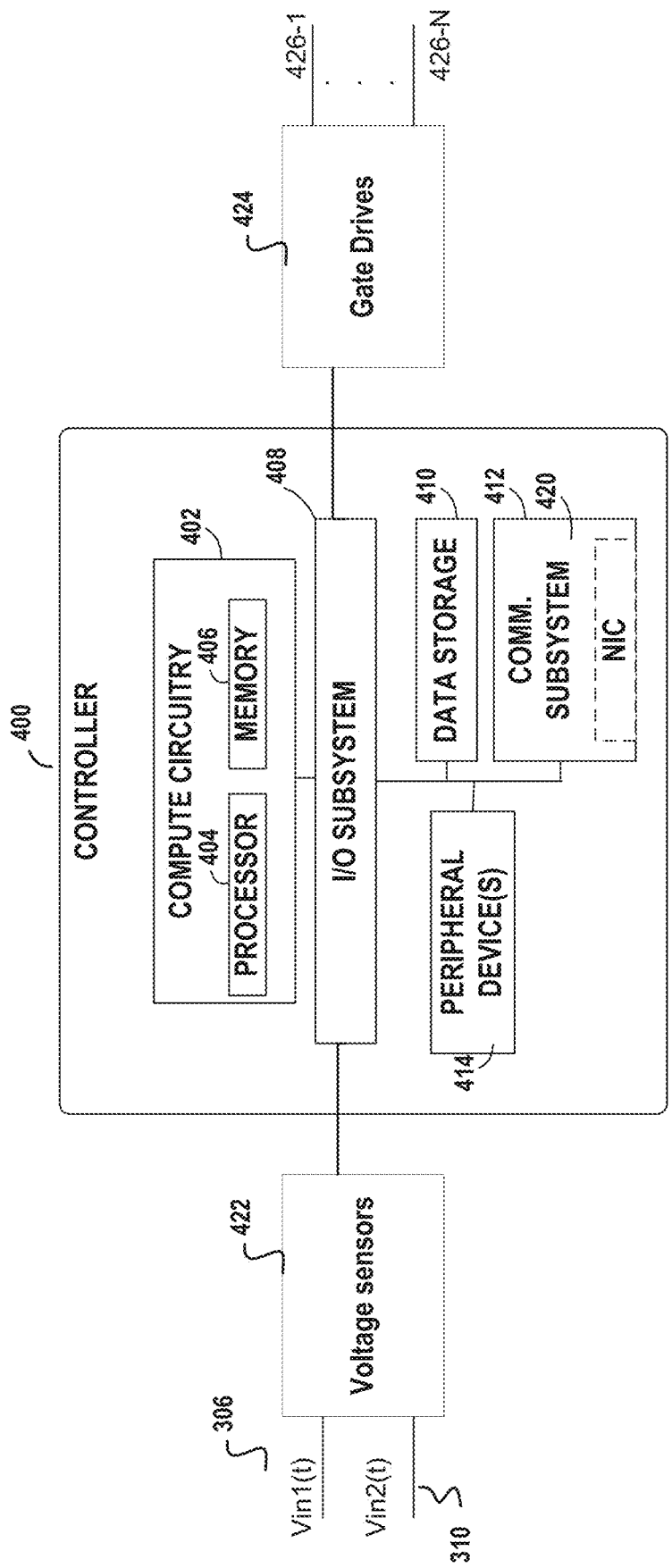
FIG. 4 is a schematic diagram of a controller for controlling a unit level isolated bus transfer switching according to an example embodiment.

FIG. 4 is a schematic diagram of a controller 400 for controlling switching of the ULIBTS 300 according to an example embodiment. The controller 400 determines which primary side power supply 307 or 310 is used. In embodiments, one power supply 307 or 310 is selected as the preferred source, for example, through user input, mechanical master switches, software settings, etc., and any other source/s would be backup sources. If the preferred primary power source is available and operating within normal parameters (e.g., parameters for power output, heat, etc.), then that power source will be used to provide power to load/s receiving power at the secondary side of the transformer 302. However, if the preferred primary power source drops out of a useable range (e.g., an adverse condition develops, such as power output decreasing below a threshold, or spiking above a threshold, or becoming overheated, etc.) as detected by the controller 400 (FIG. 4), then a different power source (e.g., the next highest priority power source, although embodiments are not limited thereto) that is within normal operational range may be selected for use.

The voltage sensor/s 422 can detect loss of power input within half of a cycle. The voltage sensor/s 422 can also detect other conditions, for example, high-input conditions and other, more slow deviations outside of acceptable operating parameters. The controller 400 and voltage sensor 422 can be implemented using multiple analog-to-digital converters (ADCs) to sample a scaled and rectified signal that is proportional to each input power supply 307, 310. To detect a complete loss of an input within a half cycle, the voltage sensor 422 may be configured to detect a wide deviation (for example, a deviation exceeding 20 percent) from the expected sample values at specific time intervals after each zero crossing is detected, for example at ⅛, ¼, and ⅜ of a period. To detect an RMS voltage that is out of the specified normal range, the voltage sensor 422 can calculate a running RMS estimation based on the multiple samples of the input source signal and detect whether the RMS voltage is more than for example 5% outside the expected nominal voltage over a time segment of multiple utility cycles. Additionally, one of ordinary skill in the art will understand that other methods and devices can be used to detect adverse conditions.

The voltage sensor/s 422 shall maintain isolation between the input power supplies 307, 310. In examples, optical isolation is maintained between each of the input power supplies 307, 310 and the voltage sensor/s 422. In these and other examples, transformer isolated signals are used. For example, optically isolated or transformer isolated signals could be used.

The controller 400 can be included in or connected to, for example, ship system control rooms proximate or remote from one or more shipboard power sources or other critical power sources. The controller 400 may include a compute engine (also referred to herein as "compute circuitry") 402, an input/output (I/O) subsystem 408, data storage device 410, communication circuitry 412, and, optionally, one or more peripheral devices 414, all coupled to each other in via the I/O subsystem 408 as will be described further herein. In other examples, one or more of the devices and apparatus of the controller 400 may include other or additional components, such as those typically found in a computer (e.g., a display, peripheral devices, etc.). Additionally, in some examples, one or more of the illustrative components can be incorporated in, or otherwise form a portion of, another component.

The controller 400 may receive or take as input the output of voltage sensor 422. As described herein, the voltage sensor/s 422 can sense properties of a plurality of power sources, for example, power supply 307 and power supply 310, as described earlier herein with reference to FIG. 3, to, e.g., detect adverse conditions. While two power sources are shown, any number of power sources can be included and sensed by voltage sensor/s, or voltage sensor 422. In one or more embodiments, the voltage sensor/s 422 can detect low power conditions, power spikes, and irregularities in the power source signals.

The controller 400 can be embodied as any type of engine, device, or collection of devices capable of performing various compute functions using analog and/or digital circuitry. In some examples, the controller 400 can be embodied as a single device such as an integrated circuit, an embedded system, a field-programmable gate array (FPGA), a system-on-a-chip (SOC), or other integrated system or device. In the illustrative example, the controller 400 includes or is embodied as a processor 404 and a memory 406. The processor 404 can be embodied as any type of processor capable of performing the functions described herein (e.g., executing an application). For example, the processor 404 can be embodied as a multi-core processor(s), a microcontroller, or other processor or processing/controlling circuit. In some examples, the processor 404 can be embodied as, include, or be coupled to an FPGA, an application specific integrated circuit (ASIC), reconfigurable hardware or hardware circuitry, or other specialized hardware to facilitate performance of the functions described herein.

The memory 406 can be embodied as any type of volatile (e.g., dynamic random-access memory (DRAM), etc.) or non-volatile memory or data storage capable of performing the functions described herein. Volatile memory can be a storage medium that requires power to maintain the state of data stored by the medium. Non-limiting examples of volatile memory can include various types of random-access memory (RAM), such as DRAM or static random-access memory (SRAM). One particular type of DRAM that can be used in a memory module is synchronous dynamic random-access memory (SDRAM).

In an example, the memory device is a block addressable memory device, such as those based on NAND or NOR technologies. A memory device can also include a three-dimensional crosspoint memory device, or other byte addressable write-in-place nonvolatile memory devices. The memory device can refer to the die itself and/or to a packaged memory product. In some examples, all or a portion of the memory 406 can be integrated into the processor 404. The memory 406 can store various software and data used during operation such as one or more applications, data operated on by the application(s), libraries, and drivers.

The compute circuitry 402 is communicatively coupled to other components of the controller 400 via the I/O subsystem 408, which can be embodied as circuitry and/or components to facilitate input/output operations with the compute circuitry 402 (e.g., with the processor 404 and/or the main memory 406) and other components of the compute circuitry 402. For example, the I/O subsystem 408 can be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 can form a portion of a system-on-a-chip (SoC) and be incorporated, along with one or more of the processor 404, the memory 406, and other components of the compute circuitry 402, into the compute circuitry 402.

The one or more illustrative data storage devices 410 can be embodied as any type of devices configured for short-term or long-term storage of data such as, for example, memory devices and circuits, memory cards, hard disk drives, solid-state drives, or other data storage devices. Individual data storage devices 410 can include a system partition that stores data and firmware code for the data storage device 410. Individual data storage devices 410 can also include one or more operating system partitions that store data files and executables for operating systems depending on, for example, the type of controller 400.

The communication circuitry 412 can be embodied as any communication circuit, device, or collection thereof, capable of enabling communications over a network between the compute circuitry 402 and another compute device (e.g., an edge gateway of an implementing edge computing system). The communication circuitry 412 can be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 412 includes a network interface controller (NIC) 420, which can also be referred to as a host fabric interface (HFI). The NIC 420 can be embodied as one or more add-in-boards, daughter cards, network interface cards, controller chips, chipsets, or other devices that can be used by the controller 400 to connect with another compute device (e.g., an edge gateway node). In some examples, the MC 420 can be embodied as part of a system-on-a-chip (SoC) that includes one or more processors, or included on a multichip package that also contains one or more processors. In some examples, the NIC 420 can include a local processor (not shown) and/or a local memory (not shown) that are both local to the NIC 420. In such examples, the local processor of the NIC 420 can perform one or more of the functions of the compute circuitry 402 described herein. Additionally, or alternatively, in such examples, the local memory of the NIC 420 can be integrated into one or more components of the client compute node at the board level, socket level, chip level, and/or other levels.

Additionally, in some examples, a respective controller 400 can include one or more peripheral devices 414. Such peripheral devices 414 can include any type of peripheral device found in a compute device or server such as audio input devices, a display, other input/output devices, interface devices, and/or other peripheral devices, depending on the type of the controller 400. In further examples, the controller 400 can be embodied by a respective edge compute node (whether a client, gateway, or aggregation node) in an edge computing system or like forms of appliances, computers, subsystems, circuitry, or other components.

Generally, the controller 400 may be operatively coupled to the first primary circuit 308 and the second primary circuit 312 to control which of the powers supplies 307, 310 is operatively coupled to the Vout(t) 314. More specifically, the controller 400 will control gate drive circuitry 424, wherein the gate drive circuitry can include elements of gate drives described earlier herein with respect to FIG. 2A and FIG. 2B (e.g., gate driver circuit 208 (FIG. 2A) and gate drive circuit 222 (FIG. 2B)), to turn "off" switching elements (e.g., switching elements within primary circuits 308, 312, FIG. 3) that correspond to the power supply 307 or 310 (FIG. 3) that has dropped out of useable range while synchronously turning "on" the switching element within the primary circuit 308, 312 that corresponds to a secondary or backup power supply 307 or 310. The gate drive circuitry 424 may have N outputs, 426-1 through 426-N, where N is the number of switching elements within the ULIBTS 300 (FIG. 3). With respect to the example embodiment illustrated in FIG. 3, therefore, the gate drive circuitry 424 will include 12 outputs, 426-1, 426-2, 426-3, 426-4, 426-5, 426, 426-7, 426-8, 426-9, 426-10, 426-11, 426-12 to correspond to S1, S2, S3, S4, S5, S6, S7, S8, S9, S10, S11, S12. Power source changeover can occur at the end of a switch interval for the switch-mode transformer 302. In embodiments, the changeover between different input power buses can occur in microseconds, for example about 4 microseconds for a 250 kHz switch-mode transformer 302, rather than in several milliseconds as can occur with other bus transfer switches described earlier herein.

However, in some examples, AC power sources will not be synchronized, meaning that the positive peaks, opposite polarity peaks, and/or crossovers of the AC power source signals do not occur at the same time. Accordingly, changeover between the different input power buses can generate a current spike as the capacitor $C_{out}$ (FIG. 1) filtering the output of the secondary side switch element 316 is suddenly changed to a voltage that is considerably different then the voltage just before the changeover. In a worst-case scenario, for example, the primary input power source AC signal can be at a sine-wave peak while a secondary input power source AC signal is at an opposite polarity peak at the instant that changeover was to occur from the primary to the secondary input power source. In some embodiments, filter capacitor sizes can be adjusted, while in other embodiments, the controller 400 can control switching elements within the primary circuits 308, 312 to delay switching over to the secondary input power source until the primary input power source sine wave signal crosses zero with the expectation that $C_{out}$ will quickly discharge to zero volts. In other embodiments, the switch element within the primary circuit 308, 312 corresponding to the secondary input power source can be turned on when the instantaneous voltage across $C_{out}$ is nearly equal to, or within five percent of, the instantaneous voltage at the back up voltage source.

Figure 5:
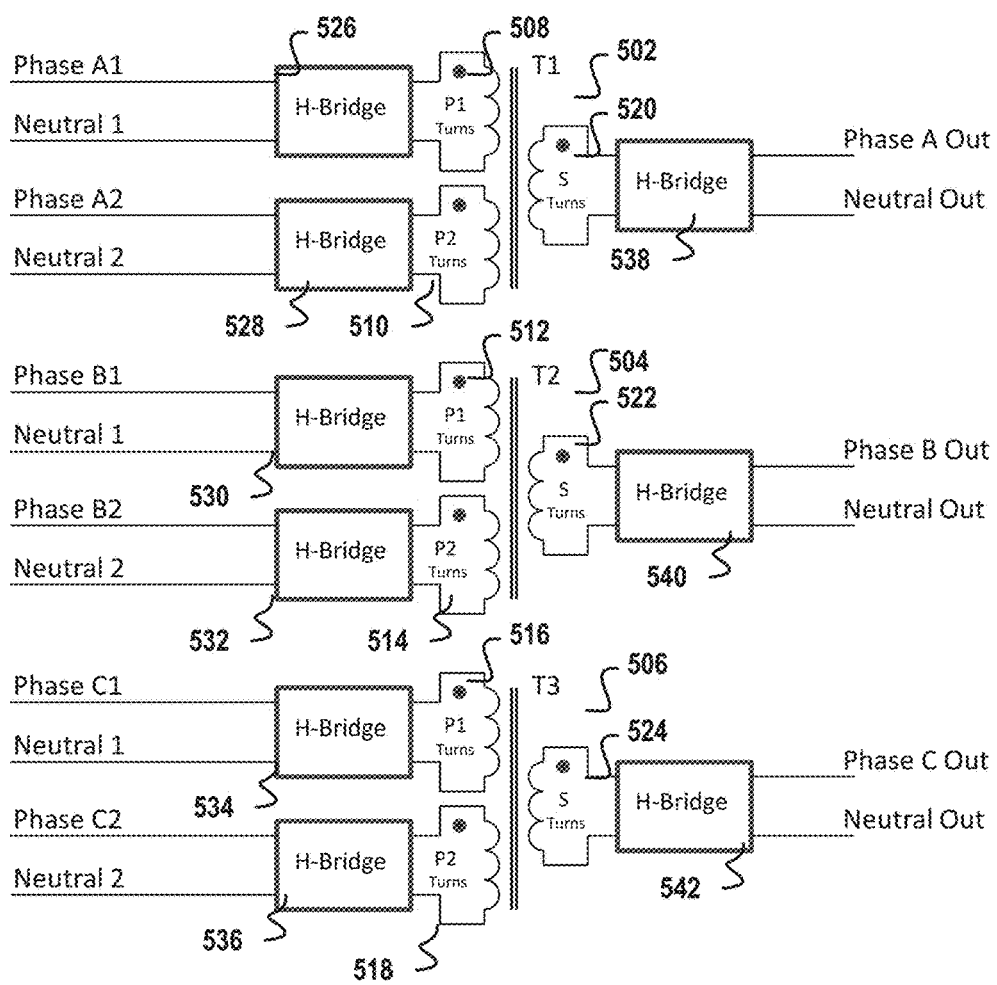
FIG. 5 illustrates a three-phase power system 500 including three-phase Wye sources according to an example embodiment.

Embodiments can also be used within three-phase power systems by configuring the primary and secondary connections and turn-ratios of the ULIBTS 300 so that Wye-Wye, Wye-Delta, Delta-Delta and Delta-Wye transforms can be created. FIG. 5 illustrates a three-phase power system 500 including three-phase Wye sources according to an example embodiment. In at least these embodiments, three single-phase ULIBTS circuits 502, 504, 506 are provided, each of which is similar or somewhat similar to ULIBTS 300 in that each provides switching elements and capacitive elements similar to those shown in FIG. 3. For example, each single-phase ULIBTS circuit 502, 504 506 includes a number of primary windings 508, 510, 512, 514, 516, 518 corresponding to one phase (Phase A, Phase B, and Phase C) of each input power source and a secondary winding 520, 522, 524 to provide each phase of output. Switch elements 526, 528, 530, 532, 534, 536 are provided for each phase of each power source and can comprise H-bridges or other switching elements. A neutral is provided at each primary winding 508, 510, 512, 514, 516, 518 and each secondary winding 520, 522, 524. Switch elements 538, 540, 542 are also provided at each phase output and can comprise H-bridge switch elements, for example.

A common controller (not shown) can control all three ULIBTS circuits 502, 504, 506 in a manner similar to the controller 400 (FIG. 4). The controller can control switching simultaneously between the ULIBTS circuits, either simultaneously or using another method. In other examples, the controller can control using staggered (e.g., non-simultaneous) switching, for example, when the secondary winding is connected as a Wye in which case staggered switching allows for a transition of each secondary at a zero crossing.

Figure 6:
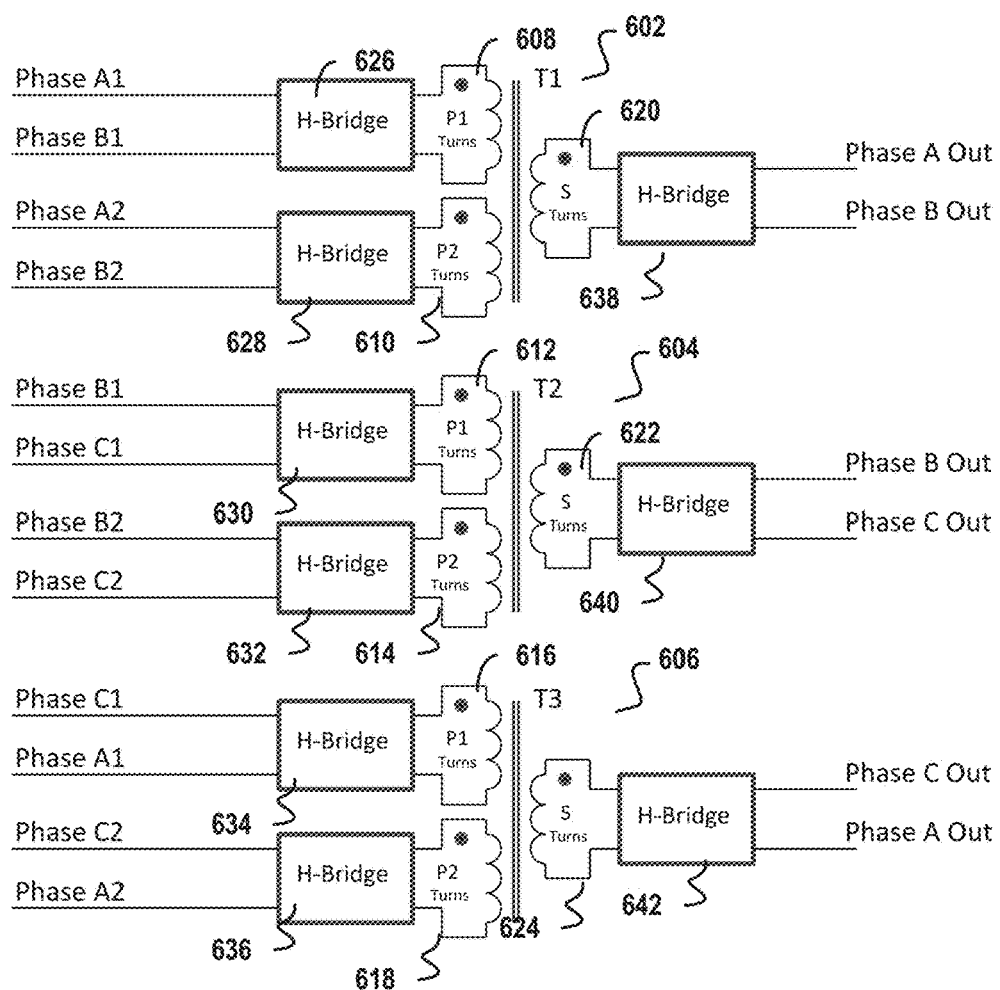
FIG. 6 illustrates a three-phase power system including three-phase Delta sources according to an example embodiment.

FIG. 6 illustrates a three-phase power system 600 including three-phase Delta sources according to an example embodiment. In at least these embodiments, three single-phase ULIBTS circuits 602, 604, 606 are provided, each of which is similar or somewhat similar to ULIBTS 300 in that each provides switching elements and capacitive elements similar to those shown in FIG. 3. For example, each single-phase ULIBTS circuit 602, 604, 606 includes a number of primary windings 608, 610, 612, 614, 616, 618 corresponding to one phase (Phase A, Phase B, and Phase C) of each input power source and a secondary winding 620, 622, 624 to provide each phase of output. Switch elements 626, 628, 630, 632, 634, 636 are provided for each phase of each power source and can comprise H-bridges or other switching elements. Switch elements 638, 640, 642 are also provided at each phase output and can comprise H-bridge switch elements, for example.

A common controller (not shown) can control all three ULIBTS circuits 602, 604, 606 in a manner similar to the controller 400 (FIG. 4). The controller can control switching simultaneously between the ULIBTS circuits, either simultaneously or using another method. In other examples, the controller can control using staggered (e.g., non-simultaneous) switching.

Figure 7:
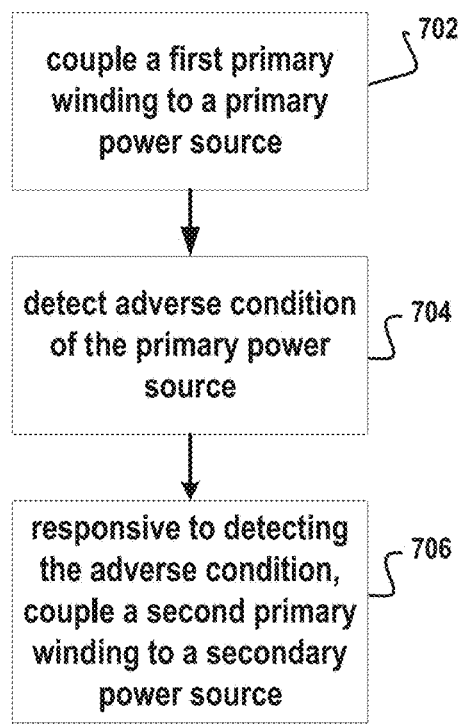
FIG. 7 is a flow diagram of a method for high-speed switching according to an example embodiment.

FIG. 7 is a flow diagram of a method 700 for high-speed switching according to an example embodiment. The method 700 can be performed by a controller 400 (FIG. 4) or elements thereof. Method 700 can begin with operation 702 with the controller 400 controlling switching elements to couple a first primary winding of a transformer to a primary power source of the plurality of power sources. The method 700 can continue with operation 704 with the controller 400 detecting an adverse condition of the primary power source of the plurality of power sources. The method 700 can continue with operation 706 with the controller 400, responsive to detecting the adverse condition, controlling switching elements to couple a second primary winding of the transformer to a secondary power source. Controlling switching elements in either or both of operation 702 and 706 can include controlling elements in an H-bridge switching element to provide output voltage that is out of phase with output voltage provided by the primary power source. The method 700 can include receiving a user input identifying the primary power source and the secondary power source of the plurality of power sources.

In some embodiments, controlling switching elements can include providing power to gate drives of respective switching elements. Responsive to detecting an adverse condition in a power source that is currently powering the load/s, power can be removed from a gate drive of a switching element coupled to the primary winding coupled to that power source, concurrently with providing power to a gate drive of a switching element coupled to the second primary winding that is coupled to the secondary (backup) power source.

In other embodiments, responsive to detecting an adverse condition in a power source that is currently powering the system load/s, power is removed from a gate drive of a switching element coupled to the primary winding coupled to that power source and providing a time delay before providing power to a gate drive of a switching element coupled to the primary winding coupled to the secondary (backup) power source. This time delay can be set based on frequency of at least one of the power sources.

In view of the above, it will be readily apparent that the functionality as described in one or more embodiments according to the present disclosure can be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

All references and publications cited herein are expressly incorporated herein by reference in their entirety into this disclosure, except to the extent they can directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An apparatus for high-speed switching between a plurality of power sources, the apparatus comprising:
   a switch-mode isolation transformer comprising:
   a plurality of isolated primary windings, each of the plurality of isolated primary windings being electrically isolated from each other and selectively couplable to a power source of the plurality of power sources, and
   a secondary winding coupled to a load; and
   a controller operatively coupled to the switch-mode isolation transformer and configured to selectively couple one of the power sources of the plurality of power sources through a corresponding isolated primary winding, responsive to detecting an adverse condition in another power source of the plurality of power sources, wherein the controller is configured to provide power to gate drives of respective switching elements, and wherein, responsive to detecting the adverse condition, power is removed from a gate drive of a switching element coupled to a first primary winding of the plurality of primary windings concurrently with providing power to a gate drive of a switching element coupled to a second primary winding of the plurality of primary windings.

2. The apparatus of claim 1, wherein the switch-mode isolation transformer operates at a frequency at least five orders of magnitude higher than a frequency of the plurality of power sources.

3. The apparatus of claim 1, wherein the switch-mode isolation transformer operates at a frequency of between 25 kHz and 2.5 MHz.

4. The apparatus of claim 1, wherein the switch-mode isolation transformer further comprises a plurality of switch circuits, each switch circuit coupled to a power source and an isolated primary winding to selectively coupled the power source to the isolated primary winding.

5. The apparatus of claim 4, wherein each switch circuit comprises a plurality of switching elements to block current in either polarity when the switching element is "off" and conduct current in either polarity when the switching element is "on".

6. The apparatus of claim 4, wherein each switching circuit comprises an H-bridge circuitry comprising four switching elements.

7. The apparatus of claim 6, wherein each of the four switching elements comprises two field effect transistors (FETs) connected with a common source.

8. The apparatus of claim 7, wherein each of the two FETs of each switching element of the four switching elements comprises a N-channel metal oxide silicon FET (MOSFET).

9. The apparatus of claim 7, wherein gates of the two FETs of each switching element of the four switching elements are driven through a common gate drive circuit.

10. The apparatus of claim 6, wherein each of the four switching elements comprises one field effect transistor (FET) coupled to four diodes.

11. The apparatus of claim 6, wherein the controller is further configured to control the H-bridge circuitry to provide inverted power output from one power source relative to another power source of the plurality of power sources.

12. The apparatus of claim 1, wherein at least one of the plurality of power sources comprises a direct current (DC) power source.

13. The apparatus of claim 12, wherein the controller is configured to control input switching elements to provide square wave output from the DC power source.

14. The apparatus of claim 1, wherein detection of an adverse condition in another power source of the plurality of power sources comprises detection of output power from another power source above a power threshold.

15. The apparatus of claim 1, wherein the controller is optically isolated from the switch-mode isolation transformer.

16. The apparatus of claim 1, wherein the switch-mode isolation transformer transforms one phase of a three-phase power source.

17. A method for controlling high-speed switching between a plurality of power sources, the method comprising:
- controlling switching elements to couple a first primary winding of a switch-mode isolation transformer to a primary power source of the plurality of power sources;
- detecting an adverse condition of the primary power source of the plurality of power sources; and
- responsive to detecting the adverse condition, controlling switching elements to couple a second primary winding of the transformer to a secondary power source, wherein controlling switching elements comprises providing power to gate drives of respective switching elements, and wherein, responsive to detecting the adverse condition, power is removed from a gate drive of a switching element coupled to the first primary winding concurrently with providing power to a gate drive of a switching element coupled to the second primary winding.

18. The method of claim 17, wherein controlling switching elements comprises providing power to gate drives of respective switching elements, and wherein, responsive to detecting the adverse condition, power is removed from a gate drive of a switching element coupled to the first primary winding and a time delay is provided before providing power to a gate drive of a switching element coupled to the second primary winding.

19. The method of claim 18, further comprising: setting the time delay based on frequency of at least one of the primary power source and the secondary power source.

20. The method of claim 17, wherein controlling switching elements to couple the second primary winding comprises controlling elements in an H-bridge switching element to provide an output voltage that is out of phase with an output voltage provided by the primary power source.

21. The method of claim 17, further comprising:
- receiving a user input identifying the primary power source and the secondary power source of the plurality of power sources.

* * * * *